United States Patent [19]

Prebola

[11] Patent Number: 4,849,788
[45] Date of Patent: Jul. 18, 1989

[54] AUTOMATIC DUAL MODE DOCUMENT REGISTRATION AND EDGE GUIDE

[75] Inventor: Jay M. Prebola, Rochester, N.Y.

[73] Assignee: Xerox Corporation, Stamford, Conn.

[21] Appl. No.: 207,554

[22] Filed: Jun. 16, 1988

[51] Int. Cl.$^4$ ............................................. G03G 15/00
[52] U.S. Cl. .................................... 355/317; 355/313; 271/3.1
[58] Field of Search ............... 358/14 SH, 3 SH, 3 R; 271/3.1, 4, 8, 9, 65, 225, 264, 265

[56] References Cited

U.S. PATENT DOCUMENTS

| | | | |
|---|---|---|---|
| 4,214,832 | 7/1980 | Kono et al. | 355/8 |
| 4,243,316 | 1/1981 | Gustafson | 355/75 |
| 4,281,919 | 8/1981 | Nomura et al. | 355/50 |
| 4,334,674 | 6/1982 | Ishii | 271/245 |
| 4,344,703 | 8/1982 | Nezu et al. | 355/76 |
| 4,419,007 | 12/1983 | Kingsley | 355/14 SH |
| 4,456,237 | 6/1984 | Buddendeck | 271/3.1 |
| 4,561,765 | 12/1985 | Masuda | 355/3 SH X |
| 4,561,772 | 12/1985 | Smith | 355/3 SH X |
| 4,602,776 | 7/1986 | York et al. | 355/14 SH X |
| 4,627,709 | 12/1986 | Kitajima et al. | 355/14 |

Primary Examiner—A. C. Prescott

[57] ABSTRACT

In a dual mode copying system, where in one mode, document sheets are fed to the platen of a copier with a document feeder overlying the platen to be registered and copied, and where, in a second mode the document feeder is liftable away from the platen and the copier provides for alternative manual document sheet placement in a registration position on the platen defined by a registration edge guide projectng above the upper surface of the platen, adjacent one edge of the platen; dual mode document edge registration and edge guide means automatically repositionable between first and second positions at two different levels above the upper surface of the platen, moving into the first position automatically in response to the lifting of the document feeder away from the platen to project a vertical document registration edge obstructing surface above the upper surface of the platen adjacent the platen, but which, in the second position is automatically pushed below that surface by movement of the document feeder towards the platen, and separate oppositely sloping, document edge guiding upper surfaces extending from below to above the upper surface of the platen even in the second position to provide ramp surfaces assisting the unobstructed movement of a document by the document feeder over the adjacent edge of the platen.

4 Claims, 5 Drawing Sheets

AUTOMATIC DUAL MODE DOCUMENT REGISTRATION AND EDGE GUIDE

The present invention relates to a document handling system for a copier and more particularly relates to an improved system for guiding and edge registering document sheets to be copied on a copier platen compatibly with both automatic document feeding and manual document platen placement and edge-registering.

The subject document handler will be alternatively referred to herein as a "DADF" (duplex automatic document feeder) or "DADH" for convenience herein. However, as shown herein, with a low-cost modification, it can also provide a duplex recirculating document handler (DRDH).

As xerographic and other copiers increase in speed, and become more automatic, it is increasingly important to provide higher speed yet more reliable and more automatic handling of the document sheets being copied, i.e. the input to the copier. It is desirable to feed, accurately register, and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

Even with slower copying rate copiers, it has become increasingly desirable to provide at least semi-automatic document handling (SADH), allowing an operator to "stream feed" originals into an input of the copier document handler or feeder, or to provide an automatic document handler (ADH) or feeder (ADF) for automatic feeding from a stack of documents, with the document handler providing all the deskewing, feeding and final registration of the documents into the copying position, and then ejecting the documents from the platen automatically.

A preferable document handling system is one that utilizes an existing or generally conventional copier optical imaging system, including the external transparent copying window (known as the platen or imaging station) of the copier. It is also desirable that the document handling system be readily removable, as by pivoting away, to alternatively allow the copier operator to conventionally manually place documents, including books, on the same copying platen. Thus, a lighter weight document handler is desirable. It is also desirable that a document registration edge alignment or positioning system be available for such manual copying which is compatible with that used for or with the document handler.

In the description herein the term "document" or "sheet" refers to a usually flimsy sheet of paper, plastic, or other such conventional individual image substrate, and not to microfilm or electronic images which are generally much easier to manipulate. The "document" is the sheet (original or previous copy) being copied in the copier onto the "copy sheet", which may be abbreviated as the "copy". Related, e.g. page order, plural sheets of documents or copies are referred to as a "set". A "simplex" document or copy sheet is one having its image and page number on only one side or face of the sheet, whereas a "duplex" document or copy sheet has "pages", and normally images, on both sides, i.e., each duplex document and copy is considered to have two opposing sides, faces, or "pages" even though no physical page number may be present.

The present invention is suitable for either non-precollation or precollation copying. Precollation copying is automatically plurally recirculated document set copying provided by a recirculating document handling system or "RDH". With relatively minor changes, this may be provided as shown herein in FIGS. 6 and 7. However, the initially disclosed system of FIGS. 1–15 per se is for non-precollation (or post-collation) copying, referred to as automatic document handling (ADH) as discussed above, in which the documents need only be fed and copied once.

In contrast, in a post-collation copying system, such as with an ADH or SADH, plural copies may be made at one time from each document page and post-collated by being placed in separate sorter bins of a copy output sorter. Thus, the document set need only be manually or semi-automatically fed to the imaging station once (if the number of copy sets being made is less than the number of available sorter bins). A disadvantage is that the number of copy sets which can be made in one document set feed is limited by the number of available sorter bins. Also, a sorter adds space and complexity and is not well suited for on-line finishing. However, postcollation copying, or even manual document placement, is desirable in certain copying situations to reduce cost and complexity of the document handler, and/or minimize document handling, particularly for delicate, valuable, thick or irregular documents, or for a very large number of copy sets. Thus, it is desirable that a document handler for a precollation copying system be compatible with, and alternatively usable for, post-collation and manual copying as well.

An example of another DADF with another "pop-up" registration edge gate is shown in a U.S. application, Ser. No. 146,181, filed Jan. 20, 1988, and entitled "Automatic Document Conveying Device for Original in a Two-Sided Copy Machine", based on FX/20656, Japanese Patent Application No. 62-247127, filed Feb. 6, 1987 and FX/20700, Japanese Patent Application No. 62-28177, filed Feb. 12, 1987.

Some current examples of prior art recirculating document handlers are disclosed in U.S. Pat. Nos. 4,076,408; 4,176,945; 4,278,344; 4,330,197, 4,466,733; and 4,428,667.

Of interest is the DADF disclosed in IBM TDB Vol. 14, No. 5, p. 1547, published October 1971. A more conventional duplex document inverter system with a circular inversion loop with only one inversion from and back to a platen is shown there; or in EK U.S. Pat. No. 4,714,241, issued Dec. 22, 1987; or in Koukai Gihoh Vol. 12-28, 87-8030, indicated as published July 20, 1987 (FX/21152).

Of particular interest re the subject duplex document copying order in particular, as well as its DADF configuration, is Canon U.S. Pat. No. 4,727,398 issued to T. Honjo et al Feb. 23, 1988, which bottom-feeds documents from one end of an over-platen tray and inverts and returns duplex documents at one side of the platen, but with a different duplexing inverting path. Another such reference is Canon U.S. Pat. No. 4,544,148 on a DADF with a similar document tray location but also having a different document inverting path from that disclosed herein (see, e.g., FIG. 8); and Canon U.S. Pat. No. 4,723,772 issued Feb. 9, 1988 to T. Hoji, et al.

Of particular interest is Canon U.S. Pat. No. 4,627,709 issued Dec. 9, 1986 to T. Kitajima et al. In Col. 6 it describes a flexible sheet Mylar ™ deflector 37 adjacent original passage outlet 12 to help guide the reversed original to another adjacent passage 26. See FIGS. 2A, 8A or 13A. This is in an RDH configuration similar to the above cited Canon patents.

The document side edge registration (cross-roller) system disclosed here is the same as that disclosed in Xerox Corporation U.S. Pat. No. 4,621,801 (D/83024), which corresponds to that in the Xerox Corporation "1065"copier automatic recirculating duplex document handling system.

The basic ADF shown herein, except for the duplex document capabilities, i.e., the simplex document path, but without any duplex document inverter, and a suitable copier, etc., is the subject of Xerox Corporation U.S. Pat. No. 4,727,401, issued Feb. 23, 1988 to S. R. Partilla and [the same] E. L. Dinatale (D/86035).

By way of further background description of a suitable copier with which this DADE (or DRDH) system may be used, there is noted Xerox Corporation U.S. Pat. No. 4,708,462 on Dual Mode Duplexing issued to Denis J. Stemmle (D/84210D1). It discloses a copier which can select between immediate (direct loop path) duplexing or conventional duplex buffer tray (stack) duplexing, for optimizing duplex copying under various conditions (set size, sheet size, etc.).

Prior art of particular interest re the subject feature of a pivotal platen edge unit which will pop up at the platen edge to provide a manual registration edge hard stop, with a vertical surface extending above the platen surface for the document, in the manual copying mode, when the ADF is lifted, includes, for example, Fuji Xerox U.S. Pat. No. 4,334,674; Ricoh U.S. Pat. No. 4,214,832, esp. FIGS. 11-12 and Col. 10, middle; Canon U.S. Pat. No. 4,281,919, e.g., FIGS. 10-12 and Col. 15, and claim 25 et al.; and Koni U.S. Pat. No. 4,344,703. U.S. Pat. No. 4,243,316 to Gustafson shows a pivotal registration gate 28 also of interest to the platen edge guide member and registration gate disclosed herein.

Although faster, more accurate, and automatic feeding into and registration of each document at the correct position on the platen to be copied is highly desired, this is difficult to accomplish without skewing (rotating) the document and/or damaging the edge of the document, particularly as it is being stopped, and to provide side edge registration, as well as deskewing. One problem is that documents can vary widely in sheet size, weight, thickness, material, condition, humidity, age, etc. Documents may even have curls, wrinkles, tears, "dog-ears", cut-outs, overlays, tape, paste-ups, punched holes, staples, adhesive or slippery areas, or other irregularities. Unlike sets of copy sheets, which generally are all from the same new clean batches and therefore of almost exactly the same condition and size, documents often vary considerably even if they are all of the same "standard" size, (e.g. letter size, legal size, A-4, B-4, etc.). In contrast documents even in the same set may have come from completely different paper batches or have variably changed size with different age or humidity conditions, etc. Furthermore, the images on documents and their fusing can change the sheet feeding characteristics and these images may be subject to damage in feeding if not properly handled, e.g. smearing of fresh typewriting ink. Yet it is desirable to automatically or semi-automatically rapidly feed, register and copy even a mixture of sizes, types, and conditions of documents without document jams or document damage and with each document correctly and accurately aligned to a desired registration position.

One of the most difficult to achieve features for automatic document handling is the rapid, accurate, reliable, and safe registration of each document at the proper position for copying. Conventionally the document is desirably either center-registered or corner-registered (depending on the copier) by the document handler automatically at a preset registration position relative to the copier platen. At this registration position two orthogonal edges of the document are aligned with two physical or positional (imaginary) registration lines of the copier platen at which the original document is properly aligned with the copier optics and copy sheet/photoreceptor registration system for correct image transfer of the document image to the photoreceptor and then to the copy sheet. This registration accuracy is desirably consistently within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents.

In preferred types of copying systems the document is registered for copying overlying a selected portion of full-sized (full-frame) platen which is at least as large as the largest document to be normally copied automatically. In such systems the document is preferably either scanned or flashed while it is held stationary on the platen in the desired registration position. That is, in these full-frame systems the document is preferably registered by being stopped and held during imaging at a preset position over the platen glass which is adjacent one side or edge thereof.

As shown in the art and discussed herein, document handling systems have been provided with various document transports to move the documents over the copier platen and into registration. Such document platen transports may comprise single or plural transport belts or feed wheels, utilizing frictional, vacuum, or electrostatic sheet driving forces. Various combinations of such transports are known with various registration devices or systems. Preferably the same platen transport sheet feeder is used to drive a document onto and off of the platen before and after copying, as well as registering the document.

However, lateral or second axis (side edge) document registration is known to preferably be done upstream of the platen. The present system desirably provides this with a single system for all copying modes.

Integral side or lateral registration together with side edge deskewing of the document is known to be highly desirable, particularly to avoid having to use mechanical lead edge hard stop deskewing. The present system provides this with a single system for all copying modes.

Since forward edge-registration by mechanical or "hard" stopping of the document edge against a mechanical edge, finger or gate is known to be undesirable, other systems have been developed. As shown in the cited U.S. Pat. No. 4,621,801, document registration can desirably be done without such mechanical document stops on the platen. This can be done by preregistering the document to a platen transport belt with an upstream, off-platen, pre-registration document edge sensor, fingers or rollers, and then moving the document a known, preset, distance over the platen on the belt into registration, providing there is no slippage during this entire movement between the document and the belt, i.e., stopping the document platen transport after a preset time period or movement to stop the document on the platen. Various art thereon is cited in said U.S. Pat. No. 4,621,801.

Some examples of various other patents generally teaching known copier document handlers and copiers and control systems therefor, including document and paper path switches and counters, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, 4,335,949 and 4,428,666. Conventional simple software instructions in a copier's conventional microprocessor logic circuitry and software of document handler and copier control functions and logic, as taught by the above and other patents and various commercial copiers, are well known and preferred. However, it will be appreciated that the functions and controls described herein may be alternatively conventionally incorporated into a copier utilizing any other suitable or known simple software or hard-wired logic systems, switch controllers, etc. Suitable software for functions illustrated or described herein may vary depending on the particular microprocessor or microcomputer system utilized, of course, but will be already available to or readily programmable by those skilled in the art without experimentation from the descriptions and references provided herein.

As shown in the above-cited art, the control of exemplary document and copy sheet handling systems in copiers may be accomplished by conventionally actuating them by signals from the copier controller directly or indirectly in response to simple programmed commands and from selected actuation or non-actuation of conventional copier switch inputs by the copier operator, such as switches selecting the number of copies to be made in that run, selecting simplex or duplex copying, selecting whether the documents are simplex or duplex, selecting a copy sheet supply tray, etc. The resultant controller signals may conventionally actuate various conventional electrical solenoid or cam-controlled sheet deflector fingers, motors or clutches in the copier in the selected steps or sequences as programmed. Conventional sheet path sensors, switches and bail bars, connected to the controller, may be utilized for sensing and timing the positions of documents and copy sheets, as is well known in the art, and taught in the above and other patents and products. Known copying systems utilize such conventional microprocessor control circuitry with such connecting switches and sensors for counting and comparing the numbers of document and copy sheets as they are fed and circulated, keeping track of their general positions, counting the number of completed document set circulations and completed copies, etc. and thereby controlling the operation of the document and copy sheet feeders and inverters, etc.

It is a general feature of the system disclosed herein to provide various of the features, and to overcome various of the disadvantages and limitations, discussed above and in the cited references.

The present system can provide manual or automatic deskewing and registration of both simplex and duplex documents, and do so twice for both copying presentations with inversion of duplex documents, fully compatible with a non-slip, non-skewing, over-platen feeding and registration system, i.e., a measured stop forward registration system which does not require slip or skewing of the document relative to the document platen transport and does not require mechanical document stops in the document path in that mode.

One specific feature of the embodiment disclosed herein is to provide, in a dual mode copying system wherein in one mode document sheets are fed to the platen of a copier with a document feeder overlying the platen to be registered and copied thereon, and wherein in a second mode the document feeder is liftable away from the platen and said copier provides for alternative manual document sheet placement in a registration position on the platen defined by a registration edge guide projecting above the upper surface of the platen, adjacent one edge of the platen; the improvement comprising:

automatically repositionable dual mode document edge registration and edge guide means repositionable between first and second positions at two different levels above said the upper surface of said platen, means for automatically moving said edge registration and edge guide means into said first position in response to said lifting of said document feeder away from said platen, said edge registration and edge guide means having a substantially vertical document registration edge obstructing surface which in said first position substantially projects above said upper surface of said platen adjacent said platen, but which in said second position is below said upper surface of said platen, means for automatically repositioning said edge registration and edge guide means from said first position into said second position by movement of said document feeder towards said platen, said edge registration and edge guide means having at least one sloping document sheet edge guiding upper surface extending from below to above said upper surface of said platen in said second position to provide a ramp surface for assisting the unobstructed movement of a document by said document feeder over said adjacent edge of said platen.

Further features provided by the system disclosed herein, individually or in combination, include those wherein said edge registration and edge guide means has two oppositely sloping document sheet edge guiding upper surfaces extending above said upper surface of said platen in said second position to provide two ramp surfaces for assisting the unobstructed movement of a document by said document feeder over said adjacent edge of said platen in either direction of movement of the document; and/or wherein said edge registration and edge guide means adjacent said platen has a generally pyramid shaped upper surface defining said two ramp surfaces, and a substantially vertical end surface extending below the one said ramp surface most adjacent to said platen to provide said document registration edge obstructing surface; and/or wherein said means for automatically moving said edge registration and edge guide means into said first position is a spring means, and said means for automatically repositioning said edge registration and edge guide means from said first position into said second position comprises a portion of said document feeder mechanically pushing said edge registration and edge guide means down by a preset distance, without any other motive means.

All references cited herein, and their references, are incorporated by reference herein for appropriate teachings of additional or alternative details, features, and/or technical background.

Various of the above-mentioned and further features and advantages will be apparent from, but are not limited to, the following specific examples of applications of the invention. The following description of these exemplary embodiments include drawing figures (approximately to scale) wherein:

FIG. 1 is a partly schematic side view of an exemplary simplex/duplex document handler incorporating one example of the present invention (as shown enlarged in FIGS. 4 and 5);

FIG. 2 is an enlarged and partially cross-sectional view of a portion of the DADH of FIG. 1 relating to an exemplary document side registration and deskewing system from U.S. Pat. No. 4,621,801 incorporated therein;

Figure 1:
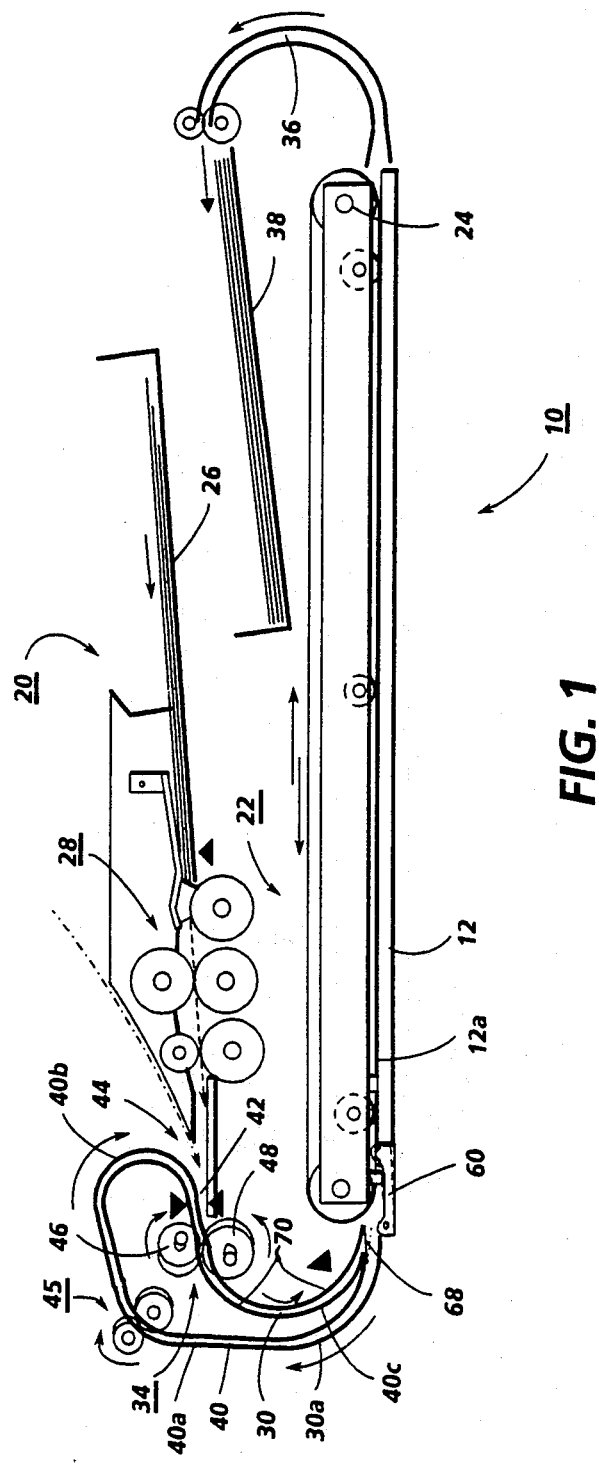

Referring to the DADH example of FIG. 1 et al, it will be appreciated that the system described herein may be utilized with various other document handlers, and with almost any copier, including various of those incorporated by reference herein. Thus the only portion of an exemplary copier 10 which need be illustrated here is the copier platen 12.

Figure 6:
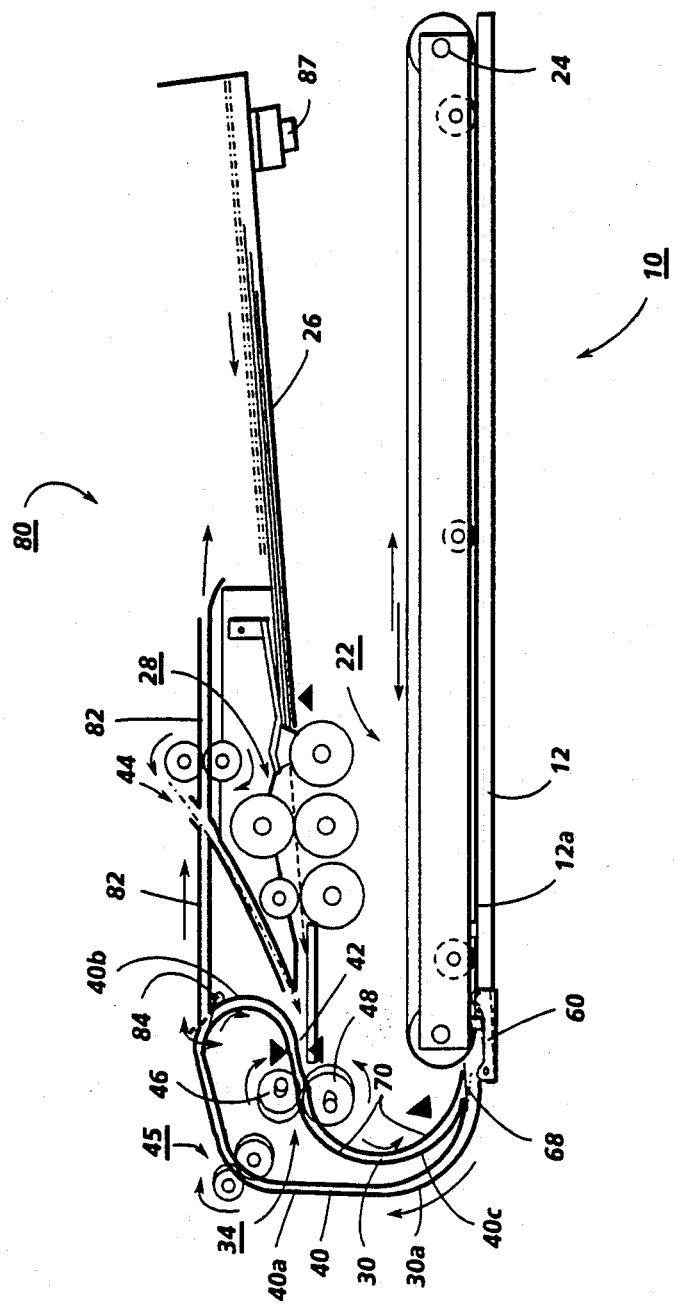
FIGS. 6 and 7 show respective RDH versions (modifications) of the DADH of FIGS. 1-5.
Figure 7:
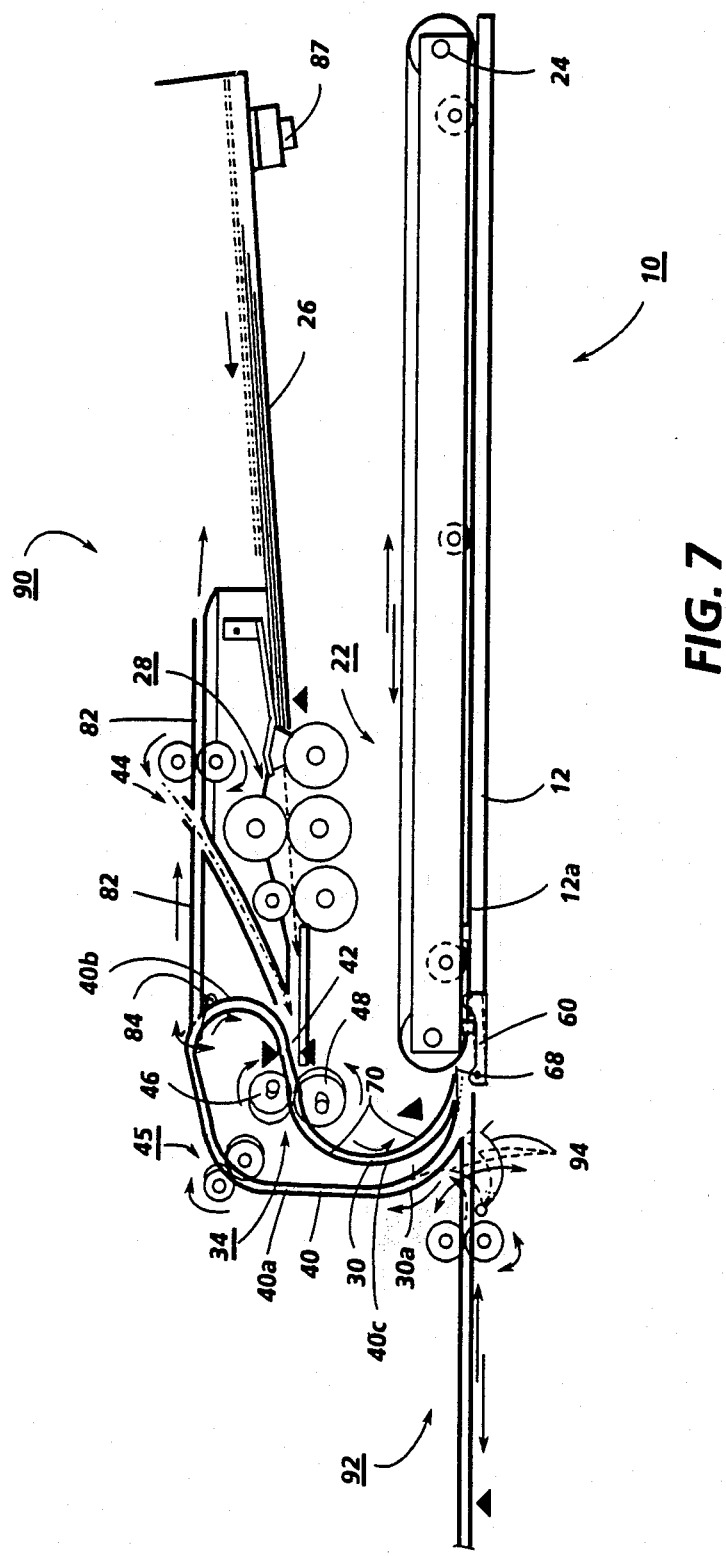

In the exemplary DADF system 20 disclosed here all modes of operation utilize the same trays and feeders, including platen document transport 22 and its drive (preferably comprising a stepper or servo motor 24 with encoder). Components may also be shared with an RDH mode of operation of this document handler, as shown in FIGS. 6 and 7. All documents to be copied by the copier 10 are sequentially fed to the platen 12 by the DADF 20 where they are driven over platen surface 12a into a desired copying registration position by the platen transport 22 with its drive 24, and then ejected by that belt transport system 22 from the platen 12. For all modes, including recirculating (precollation) document copying, the set of original documents may be initially loaded stacked face-up into the document tray 26. They are sequentially fed out from the bottom of the stack by a conventional sheet separator/feeder 28 in all modes.

Referring particularly to FIG. 1, all document sheets 27 are initially fed downstream from the tray 26 through a simplex path 30 to the acquisition entrance to the belt transport system 22, adjacent the platen 12. The tray 26 overlies the platen, and the path 30 conventionally provides the shortest possible path connection. The simplex path 30 has a single "C" shaped inversion inverting segment 30a. Thus the documents are turned over once before being presented to the platen. As will be described later herein, the initial portion of this simplex path 30, (just downstream of the separator/feeder 28, at the end of tray 28 and upstream of the inverting segment 30a) includes a side edge registration and deskewing system 34. As will be further described herein, this system 34 may be a known crossed-rolls edge guide system, for example, that described in the cited U.S. Pat. No. 4,621,801. However, this system can be a different type, for example, the system described in a copending commonly assigned application filed April, 1988 by Lam Wong (D/88005).

The DADH unit 20 may be utilized as a non-recirculating automatic document feeder (ADF) as in FIGS. 1-5 by placing the documents in tray 26 but not returning them to the tray 26 after copying, or by only circulating them once. After copying, documents in the ADF version of FIG. 1 may be ejected, as shown, from the opposite, downstream, end of the platen into an output inverting path 36 which inverts the documents and ejects them up into an output restacking tray 38. The tray 38 here is also spaced above the platen and the belt transport system 22, but is partially underlying the tray 26, for overall compactness of the DADF 20. The inverting path 36 provides restacking of the documents in the same collated order in which they were initially stacked in tray 26.

If the documents are duplex documents requiring inversion, they are inverted in a duplex path 40. The duplex path 40 here is a continuous unidirectional but non-circular loop which starts and ends at the same side of the platen. The duplex path 40 includes, in order, two inverting segments 40a and 40b and the single inversion inverting segment 30a of the simplex path 30. The duplex path 40 smoothly merges into the simplex path 30 at a path intersection 42 upstream of the edge registration and deskewing system 34 but downstream of the separator/feeder 28. At the intersection 42 each duplex document has been turned over twice from its orientation coming off the platen, and is feeding in the downstream direction into the simplex path 30, i.e., in the same feeding direction as a document being initially fed from the tray 26, as shown by the dashed arrow in FIG. 1. An alternate single sheet bypass input 44 may also be provided there as shown by the illustrated dot-dash arrow. All three said paths 30, 40, 44 are entering the side edge registration and deskewing system 34, and may also use the same sensor, shown there schematically as a solid diamond. All three paths are common at this point, and moving in a common direction into the edge registration and deskewing system 34. The system 34 here includes fixedposition cross-rolls 46 and 48 acting on the document sheet near one edge. Thus the same edge registration and deskewing mechanism and mode of operation, and then the rest of the simplex path 30, can be used for all modes of operation and all documents.

Desirably, as shown and further described herein, the duplex path 40 in segment 40a or 40b also includes a set of sheet feed rolls 45 oppositely skewed to drive the duplex documents therein sideways, but oppositely to the side registration movement direction of the side edge registration and deskewing system 34, as well as forward. Thus the duplex documents are provided an appropriate transverse entry position for entry into the side edge registration and deskewing system 34, and reduced edge drag.

A known duplex document copying sequence may be utilized. Note Canon U.S. Pat. No. 4,727,398, cited above. If, for example, the stack of documents being copied is three duplex documents, these will be pages ½, μ, 5/6, and the first document fed can be the bottom document 5/6. Side 5 will be fed face down at the platen first, through the common simplex path. But to provide 1-N order copying, the duplex document is preferably not copied at that point. It is removed and inverted and returned to the platen as described herein so that page 6 can be copied first. Then it may be inverted again in the same way to copy side 5. Then that document can be ejected and the next document fed and copied on both sides in the same manner. The cycle repeats until all duplex documents have been fed and copied.

Figure 4:
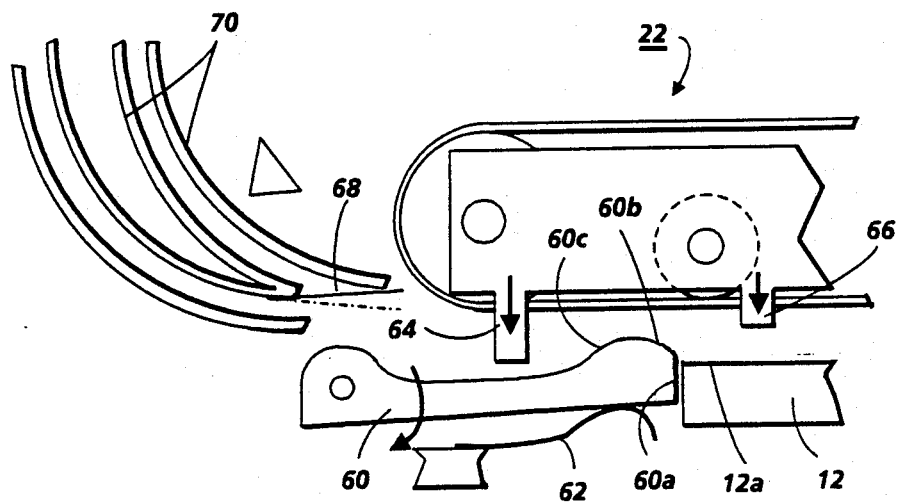
FIGS. 4 and 5 are exemplary enlarged side views of the exemplary subject dual mode platen edge guide and manual registration system which is incorporated into the FIG. 1 DADH, shown in two positions.
Figure 5:
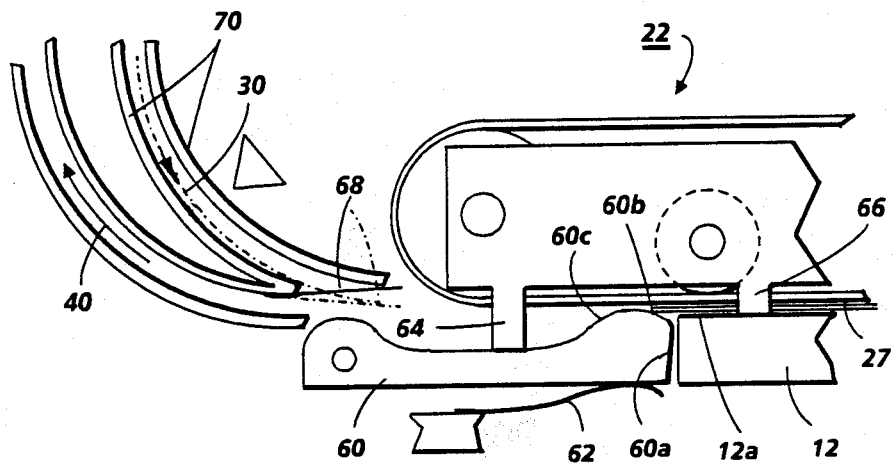

Turning now to FIGS. 4 and 5, an enlarged view of the subject end-of-platen-area is provided. The preferred dual mode pivotal edge guide and registration system feature is better disclosed here, shown in its two operating positions. FIG. 4 shows the DADF 20 being lifted away from the platen 12 to provide for manual document placement and copying on the platen. In this manual mode the DADF is disabled and one end of the pivotal platen edge guide unit 60 is automatically pivoted up by a a spring 62 to provide a manual document registration edge hard stop at 60a. This manual registration edge is provided here by a vertical surface 60a extending, in this mode, above the platen surface 12a directly adjacent the edge of the platen.

In contrast, FIG. 5 shows the DADF 20 latched down in its normal, operating, position, in which the platen transport 22 belt is closely overlying the platen. The DADF 20 operating position relative to the platen can be conventionally located or determined by the engagement of locating or stop pads 66 or the like with the outside edges of the platen or its surrounding copier support. In this mode the lowering of the DADF 20 has automatically pushed the pivotal platen edge guide unit 60 down into the position shown, by an engaging DADH 20 frame projection 64 or the like outside of the sheet path.

In this FIG. 5 DADF operating position the vertical surface 60a is pushed down below the platen surface 12a and therefore out of the document path. In this position only a smooth pyramid-shaped projection on the same end of the guide unit 60 is above the platen surface 12a. This pyramid shaped projection is formed by two oppositely sloped document ramp surfaces 60b and 60c, each at about 20–30 degrees angle from the horizontal, and both closely adjacent the edge of the platen. The ramp surface 60b engages and upwardly deflects the edge of a duplex document being fed back off the platen.

A thin flexible plastic baffle flap or automatic gate 68 prevents the reversed duplex document from entering the simplex path 30 outlet there, and deflects the document into the duplex path 40 entrance. For documents being fed onto the platen, which is always through the simplex path outlet, the document lead edge simply pushes the baffle or automatic gate 68 out of the way and then strikes the document ramp surface 60c. The ramp surface 60c engages and upwardly deflects the edge of the document just as it is being fed onto the platen, and thereby insures that it will not catch on the edge of the platen. The flap 68 acts as a one-way valve to prevent documents from entering the simplex path, and to guide them into the duplex path, during an inversion cycle.

To summarize, this pivotal platen edge unit 60 will automatically pop up at the platen edge to provide a manual registration edge hard stop with a vertical surface 60a extending above the platen document surface in the manual copying mode whenever the ADF is lifted. However this pivotal registration edge unit 60 is automatically pushed down so as to also provide two different functions in the ADF mode. The pivotal platen edge unit 60 has a smooth upstanding projection providing two cam or ramp surfaces 60b and 60c which extend above the conventional vertical manual registration surface 60a. This projecting part 60b and 60c of the pivotal platen edge unit 60 is not pushed below the plane of the platen surface 12a by the ADF 20, only surface 60a is. No solenoid actuation is required. The ramp surface 60b allows documents to be fed back off over the edge guide 60 after copying without having to lower the unit 60 with a solenoid. I.e., in the document feeding modes this unit 60 is not functioning as a gate at all, but as a ramp, and no gate actuating mechanism is required. The opposing ramp surface 60c on the input side serves as a document input ramp to lift the documents up over the platen edge.

This two-sided cam surface 60b, 60c, type of configuration of particular value to DH's which feed documents onto and off off the same side of the platen, as in this disclosed system, or as in the above-cited Canon U.S. Pat. Nos. 4,544,148, 4,579,327 or 4,627,709, or the generally corresponding Canon "7550"RDH. Documents can be fed past this platen registration edge guide in either direction without any solenoid retraction being required.

This edge-guide system 60 is compatible with various servo or stepper motor registration ADF's, i.e., with a document feed into position and stop type document registration system, which does not require a registration edge hard stop for non-manual document placements on the platen.

Turning to FIGS. 6 and 7, there are respectively shown RDH versions 80 and 90 of the DADF 20. While the general concept of converting an ADF into an RDH by adding a restack path back to the top of the stack in the same tray (here the input tray 26) is known per se, as shown in the art, this additional mode of operation may be provided and accomplished with very little hardware cost or modification in the DADF 20. In FIG. 6, an RDH 80 is provided merely by adding a short restack path 82, and a conventional solenoid actuated gate 84 deflecting documents into this restack path 82 from the top of the duplex path 40, after the inverting segment 40a and before the inverting segment 40b. Thus, simplex documents may be repeatedly recirculated for precollation copying by being fed in the normal manner through simplex path 30 to the platen to be copied, then reversed after copying to feed back through only the first part 40a of the duplex path 40 and then via the short restack path 82 back to the tray 26. Duplex documents may be recirculated in the same manner, except for additional sequential circulations through the full duplex path 40 to provide inversion and proper page presentation order, as described above.

With the addition of a restack path 82 as described above, the output path 36 and output tray 38 may be eliminated altogether for any mode of operation.

Although the FIG. 6 RDH version 80 is satisfactory for low volume or infrequent duplex document use applications, the FIG. 7 RDH version 90 is capable of higher productivity duplex document copying. It additionally provides an additional inverter 92 of a conventional type with reversible rolls and an additional gate 94 for input/output to the inverter chute. This reduces the number of circulations of the duplex documents in this overall configuration. Here, this inverter 92 is located near the beginning of the duplex path 40 in the plane of the platen, over the top of the copier, as described in said U.S. Pat. Nos. 4,621,801, 4,579,362, or the like.

Note that the exemplary gate 94 at the entrance to the added inverter chute adjacent the duplex path 40a entrance in FIG. 7 is a curved 3-position gate. It pivots into one of three positions: to allow sheet entrance to the inverter 92 chute (solid-line position); or to block entrance to inverter 92 and help deflect sheets into the duplex path 40; or (uppermost dashed-line position) to act as a different deflector to deflect reversed sheets coming back out of the inverter 92 chute up into the duplex return path, i.e. to provide an inverter return path.

In both the FIGS. 6 and 7 RDH configurations of this duplex document feeder, the single optional gated return path 82 from the top of the duplex inverting loop path into the top of the document tray, at the same side, provides for optional recirculation of the document set at minimal additional cost. Only one inversion, by the first "C" shaped path segment 40a of the duplex inverter path 40, is used between the platen edge and the tray eject path 82. The simple gate 84 deflects the sheet horizontally into the short path 82, which preferably has conventional sheet eject rolls for appropriately ejecting the sheet into the tray 26 on top of the stack. But since that will not result in inversion of a duplex sheet upon its return to the platen (through the simplex path 20) the full inverter loop 40 may also be used in the FIG. 5 embodiment of the inverter 92 in the FIG. 6 embodiment.

In both the RDH versions 80 or 90, the same advantages of the DADF 20 are retained. That is, common path usage of the same single stack separator/feeder 28, the same edge-registration and deskewing system 34, and the same platen transport 22 and its forward edge registration drive system 24.

Particularly for RDH operation, a set separator and rear edge tamper and/or tray vibrator 87 may be additionally provided for restacking and set integrity maintenance.

In FIGS. 6 and 7, sheets initially fed through SADH slot path 44 may either output into the feed tray 26 or output into a catch tray such as 38, as shown in DADF version. An alternative, straight through feeding, SADH path may be provided by providing an SADH input at the right side of the platen and an SADH catch tray at the left side of the platen, or vice versa.

Referring to the described duplex systems in general, considerable commonality between the duplex and simplex document paths and their hardware is provided in all the disclosed document handler configurations herein. Little additional hardware is required for the added duplex capability. Auto duplex can be provided simply by adding a low cost compact inversion path to the basic simplex ADF configuration. This is provided in the disclosed examples of FIGS. 1-5 by only two baffles, one set of nip (sheet feed) rollers 45 and a flexible baffle 68 providing a self-actuating gate.

With this duplexing system, "immediate" duplexing can be done, not requiring a duplex buffer tray in the copier. However, regular duplexing can also be done, storing plural copies of the first side copies in the duplex buffer tray, as shown in the above-cited U.S. Pat. No. 4,708,462. Also, two documents can be placed on the platen at once with this system, which can be used for simplex/duplex copying, as taught in the above-cited U.S. Pat. No. 4,727,401.

The illustrated example of the duplex inversion loop path 40 here comprises an outer "C" shaped duplex path segment 40a outside of but overlying and generally parallel to the inner "C" shaped simplex path 30a, with path 40a smoothly transitioning with an oppositely facing C-shaped path segment 40b interconnection into path 30a at the top ends of said two "C" shaped paths, and with the two "C" shaped paths 40a, 30a merging at their bottom ends edjacent the platen edge.

The disclosed system feeds a duplex document from the platen, before or after it has been copied on one side, back up to, and then utilizes, the regular, simplex document, input sensor and input skewed cross-roller side registration system, and the entire simplex path back to the platen, and the same simplex forward registration system (a count from a trail edge sensor). Thereby there is a considerable savings in parts, i.e., the latter components all provide a dual-mode function. And a separate optional inverter path, at the opposite end of the platen, is not required. I.e., unlike the Xerox "1065"copier RDH of U.S. Pat. No. 4,621,801, for example, an opposite end of platen and opposite end of tray inverter path and a "racetrack" RDH path is not required. The duplex inverter path here is integral the feeding end of the document tray, but on the outside of the simplex path. Thus it is easily added on as a module. Furthermore, because the entrance to the duplex path is outside, not inside, the simplex path exit, a stationary baffle duplex path entrance can be used and no solenoid or other driven gate is required to direct documents into the duplex path vs the simplex path.

The additional feed rollers 45 in the duplex inverter path 40 can be driven by the same stepper motor, but preferably are oppositely skewed to initially move the returning duplex document sheet away from the side registration edge, by about 2 mm of side-shift, to avoid edge drag in the duplex inversion path. Then the sheet is moved back into side registration when it is acquired by the regular input skewed cross-rollers and edge slot side edge registration system 34, here that of Xerox Corporation D/83024—U.S. Pat. No. 4,621,801.

Duplex documents may be stacked in normal order and orientation in the document input tray 26. They may be stacked, as shown, face up in normal 1-N order from the top to bottom so that the feeding and copying order is N-1. Here the document input tray 26 is conveniently located on top of the DADF unit.

To summarize, documents are sequentially fed from the bottom of the stack in tray 26 to the platen, in the same path for either simplex and duplex. That common path from the tray to the platen includes a single inversion, conventionally provided by a 180 degree baffled path turn 60a between the stack feeder 28 and one side of the platen. Adjacent the platen the document sheet is acquired by the platen transport belt system 22 and fed onto the platen to be copied. Then, in this system, for duplex documents, the belt is reversed to reverse-feed the document back off the same side of the platen. (After copying is completed the belt may continue to drive the document forward off the other side of the platen). As the document is fed back off the same side of the platen, the document meets a deflector and baffle system and the duplex document is deflected up into the duplex return path, which is outside of the common path, and has two inversions, and returns the document back into the top of the common path just after the stack feeder/separator but ahead of (upstream of) the side registration system and the single inversion in that path, so that a total of three inversions plus side re-registration, are provided in the total loop path from the platen to the return back to the platen, thereby returning the document inverted from its previous orientation on the platen, and re-registered using the exact same registration system as for simplex. I.e., there is only one common deskew mechanism for all documents. Also, there is good throughput, especially in view of the short path lengths.

Conventionally, additionally connected to the copier controller are document sheet lead and/or trail edge sensors strategically positioned around the document path. An acquired document may be temporarily stopped at a "wait" station position in the input path before it is transported onto the platen, i.e. to briefly wait for the completion of copying of the preceding document already on the platen.

Describing further the exemplary side edge registration and deskewing system 34 from U.S. Pat. No. 4,621,801, shown in FIGS. 2-3, in the operation of the document handler 20 all documents 27 fed from the tray 26 are initially inverted once, and deskewed, in hemicylindrical first inversion sheet path baffles 70. These baffles 70 here include at one side or edge a corresponding large radius curved edge registration guide 72, illustrated in enlarged cross-section in FIG. 2. The edge guide 72 preferably contains an integral arcuate (hemicylindrical) slot 74 with smooth generally parallel sides closely spaced from one another, (preferably substantially less than one centimeter) but spaced apart by a distance substantially greater than the thickness of the thickest document to be fed. A suitable such slot width is approximately 2.5 mm measured perpendicular to the document plane. The slot 74 depth to its bottom 76 is preferably greater. Approximately 15 mm has been found suitable. The bottom 76 of the slot 74 provides a smooth, low friction, surface against which one edge of each document sheet is deskewed and side-registered and slides along as it is being fed by deskewing rollers 48 and 46 through the arcuate baffles 70. That is, as the documents is being fed away from the stack bottom feeder 28 to the nip between the platen surface 12a and the platen transport belt 22. The strict document control provided by the continuous confinement of the edge of the document being deskewed and side registered inside the slot 74 enables side registration to be done even though the document is being deformed.

With this system, each document sheet is accurately side-registered only just before it is fed onto the platen 12, and each time it is fed or circulated. The document cannot skew or de-register before being immediately acquired by the non-slip platen transport. No on-platen side registration, or downstream side registration, or accurate restack registration is required. Likewise, all deskewing is accomplished in this same step, and lead edge deskewing is not required anywhere in this system. The platen transport need only provide for linear, non-skewing, feeding so as not to induce uncorrectably gross side mis-registration or skewing in the recirculation process. Since the platen transport 22 does not allow slippage of the document relative thereto, the upstream side registration and deskewing provided in this system is strictly maintained as the document is transported across the platen into the desired registration position. As noted, such a non-slip platen transport system is practical only with upstream deskewing of the document. Conventional on-platen deskewing against a mechanical registration edge is not practicable with a non-slip platen transport.

Figure 2:
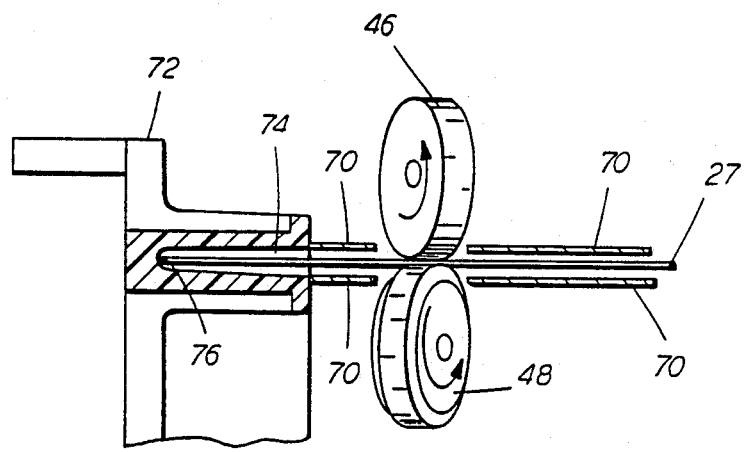
Figure 3:
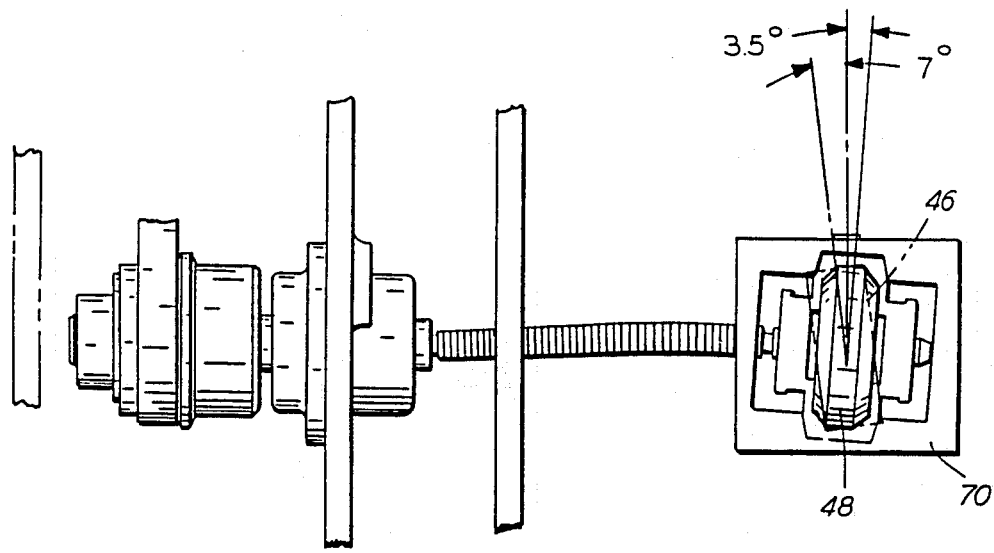
FIG. 3 is a partial top view of the side registration and deskewing roller system of FIG. 2 and its drive.

Discussing further this upstream side registration and deskewing system disclosed herein, particularly in FIGS. 2 and 3, and as further discussed in the above-cited U.S. Pat. No. 4,621,801, an appropriate limited sideways or lateral vector force component is induced in the document sheet by the different friction, and oppositely skewed, rollers 46 and 48. Here, these paired and nipped roller pairs preferably include a neoprene rubber or other relatively high friction driven roller 48 and a mating idler roller 46 of smooth stainless steel or the like. Here, the high friction driving roller 48 is preferably at an angle of approximately 3-½ degrees toward the document side edge registration wall (the slot 74 bottom 76 in the edge guide 72). The opposing smooth low friction idler roller 46 is here skewed in the opposite direction, away from the edge guide 72, by approximately 7°. The lateral vector force component of feed wheel 48 continuously urges the edge of the document fully into the slot 74 until it is fully abutting the slot bottom 76, which edge registers and deskews that docuement sheet. The opposing skew roller 46 then assists the resistance of the slot bottom 76 to further attempted lateral document movement force by rollers 48. The slot bottom 76 is, of course, parallel the primary direction of document motion.

Because slot 74 and the rest of the baffles 70 are continuously arcuate, the document is likewise arcuately curved therein. This provides high beam strength. That is, the deskewing and side registration drive force by rollers 46 and 48 is at an area in which the document sheet beam strength has been maximized by the document being highly curved into a closely controlled semi-cylindrical configuration, which very greatly increases the resistance of the document sheet to wrinkling or buckling (and therefore jamming) during this edge registration and deskewing process. The close spacing of the opposite sides of the slot 74 prevents even flimsy sheets from wrinkling, waving or buckling from the forces deskewing them.

As long as the document sheet feeds through the rollers 46 and 48, they continuously maintain a constant urging of the document edge against the slot bottom 76. The document edge slides freely in slot 74 because the edge guide 72 (preferably a monolithic metal molding) provides a continuous slot 74 with smooth surfaces all extending continuously from the outlet of the stack feeder 28 to the inlet of the platen transport 22. Also, the slot 74 and the rest of the baffles 70 have a large radius (substantially greater than approximately 5 cm) and are not skewed. The inputs to the slot 74 preferably have smoothly flared (wider) openings to guide documents therein.

While the embodiments disclosed herein are preferred, it will be appreciated that they are merely examples, and that various alternatives, modifications, variations or improvements may be made by those skilled in the art from this teaching, which are intended to be encompassed by the following or subsequent claims:

What is claimed is:

1. In a dual mode copying system wherein in one mode document sheets are fed to the platen of a copier with a document feeder overlying the platen to be registered and copied thereon, and wherein in a second mode the document feeder is liftable away from the platen and said copier provides for alternative manual document sheet placement in a registration position on the platen defined by a registration edge guide projecting above the upper surface of the platen, adjacent one edge of the platen; the improvement comprising:

automatically repositionable dual mode document edge registration and edge guide means repositionable between first and second positions at two different levels above said the upper surface of said platen, means for automatically moving said edge registration and edge guide means into said first position in response to said lifting of said document feeder away from said platen, said edge registration and edge guide means having a ssubstantially vertical document registration edge obstructing surface which in said first position substantially projects above said upper surface of said platen adjacent said platen, but which in said second position is below said upper surface of said platen, means for automatically repositioning said edge registration and edge guide means from said first position into said second position by movement of said document feeder towards said platen, said edge registration and edge guide means having at least one sloping document sheet edge guiding upper surface extending from below to above said upper surface of said platen in said second position to provide a ramp surface for assisting the unobstructed movement of a document by said document feeder over said adjacent edge of said platen.

2. The dual mode copying system of claim 1, wherein said edge registration and edge guide means has two oppositely sloping document sheet edge guiding upper surfaces extending above said upper surface of said platen in said second position to provide two ramp surfaces for assisting the unobstructed movement of a document by said document feeder over said adjacent edge of said platen in either direction of movement of the document.

3. The dual mode copying system of claim 2, wherein said edge registration and edge guide means adjacent said platen has a generally pyramid shaped upper surface defining said two ramp surfaces, and a substantially vertical end surface extending below the one said ramp surface most adjacent to said platen to provide said document registration edge obstructing surface.

4. The dual mode copying system of claim 1, wherein said means for automatically moving said edge registration and edge guide means into said first position is a spring means, and said means for automatically repositioning said edge registration and edge guide means from said first position into said second position comprises a portion of said document feeder mechanically pushing said edge registration and edge guide means down by a preset distance, without any other motive means.

* * * * *